United States Patent [19]
Ward et al.

[11] Patent Number: 5,911,156
[45] Date of Patent: Jun. 8, 1999

[54] SPLIT ELECTRODE TO MINIMIZE CHARGE TRANSIENTS, MOTOR AMPLITUDE MISMATCH ERRORS, AND SENSITIVITY TO VERTICAL TRANSLATION IN TUNING FORK GYROS AND OTHER DEVICES

[75] Inventors: Paul A. Ward, Roslindale; Eric M. Hildebrant, Watertown; Lance C. Niles, Salem; Marc S. Weinberg, Needham; Anthony S. Kourepenis, Acton, all of Mass.

[73] Assignee: The Charles Stark Draper Laboratory, Inc., Cambridge, Mass.

[21] Appl. No.: 08/805,013

[22] Filed: Feb. 24, 1997

[51] Int. Cl.$^6$ .................................................. G01C 19/00
[52] U.S. Cl. ............................................... 73/504.16
[58] Field of Search .......................... 73/504.16, 504.12, 73/504.02, 514.32, 514.16, 504.15, 504.03, 504.04; 310/309, 370

[56] References Cited

U.S. PATENT DOCUMENTS

| Re. 32,931 | 5/1989 | Staudte | 73/505 |
|---|---|---|---|
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |

(List continued on next page.)

FOREIGN PATENT DOCUMENTS

| 55-121728 | 9/1980 | Japan | H03H 9/19 |
|---|---|---|---|
| 58-136125 | 8/1983 | Japan | H03H 9/17 |
| 59-037722 | 3/1984 | Japan | H03H 9/17 |
| 59-158566 | 9/1984 | Japan | H01L 29/84 |
| 61-144576 | 7/1986 | Japan | G01P 15/09 |
| 62-071256 | 8/1987 | Japan | H01L 27/06 |
| 62-221164 | 9/1987 | Japan | H01L 29/84 |
| 63-169078 | 7/1988 | Japan | H01L 29/84 |
| 2183040 | 5/1987 | United Kingdom | G01F 15/02 |
| 9201941 | 2/1992 | WIPO | G01P 9/04 |
| 9305401 | 3/1993 | WIPO | G01P 9/04 |

OTHER PUBLICATIONS

Barth, P.W. et al., "A Monolithic Silicon Accelerometer With Integral Air Damping and Overrange Protection", 1988 IEEE, pp. 35–38.

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Micromechanical Inertial Guidance System and its Application", Fourteenth Biennial Guidance Test Symposium, vol. 1, Oct. 3–5, 1989, pp. 113–131.

Boxenhorn, B., et al., "Monolithic Silicon Accelerometer", *Transducers '89*, Jun. 25–30, 1989, pp.273–277.

(List continued on next page.)

*Primary Examiner*—Hezron Williams
*Assistant Examiner*—Richard A. Moller
*Attorney, Agent, or Firm*—Weingarten, Schurgin, Gagnebin & Hayes LLP

[57] ABSTRACT

A micromechanical tuning fork gyroscope having two center electrodes is disclosed. The two center electrodes are excited with bias potentials of opposite polarity. The oppositely biased center electrodes provide electrical symmetry across the gyroscope and thereby reduce charge transients and sensitivity to vertical translation. Currents injected directly into the proof masses are equal and opposite and thus cancel. Motor lift forces acting on the proof masses and interleaved electrodes are equal, and hence the proof masses move in pure translation, thereby reducing in-phase bias. Further, any pure translation normal to the plane of the gyroscope does effect sense axis output signals.

3 Claims, 5 Drawing Sheets

U.S. PATENT DOCUMENTS

| | | | |
|---|---|---|---|
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 5/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,815,472 | 3/1989 | Wise et al. | 128/675 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,881,410 | 11/1989 | Wise et al. | 73/724 |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,013,396 | 5/1991 | Wise et al. | 156/628 |
| 5,016,072 | 5/1991 | Greiff | 357/26 |
| 5,025,346 | 6/1991 | Tang et al. | 361/283 |
| 5,038,613 | 8/1991 | Takenaka et al. | 73/510 |
| 5,055,838 | 10/1991 | Wise et al. | 340/870 |
| 5,060,039 | 10/1991 | Weinberg et al. | 357/26 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,195,371 | 3/1993 | Grieff | 73/505 |
| 5,203,208 | 4/1993 | Bernstein | 73/505 |
| 5,205,171 | 4/1993 | O'Brien et al. | 73/517 B |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,349,855 | 9/1994 | Bernstein et al. | 73/505 |
| 5,576,250 | 11/1996 | Diem et al. | 437/228 |
| 5,604,312 | 2/1997 | Lutz | 73/504.14 |
| 5,635,638 | 6/1997 | Geen | 73/504.04 |
| 5,728,936 | 3/1998 | Lutz | 73/504.14 |
| 5,757,103 | 5/1998 | Lee et al. | 310/309 |
| 5,780,739 | 7/1998 | Kang et al. | 73/504.16 |

OTHER PUBLICATIONS

Boxenhorn, B., et al., "A Vibratory Micromechanical Gyroscope", AIAA Guidance, Navigation and Control Conference, Minneapolis, Aug. 15–17, 1988, pp. 1033–1040.

Howe, R., et al., "Silicon Micromechanics: Sensors and Actuators on a Chip", IEEE Spectrum, Jul. 1990, pp. 29–35.

Moskalik, L., "Tensometric Accelerometers with Overload Protection", Meas. Tech. (USA), vol. 22, No. 12, Dec. 1979 (publ. May 1980), pp. 1469–1471.

Nakamura, M., et al., "Novel Electrochemical Micro–Machining and Its Application for Semiconductor Acceleration Sensor IC", *Digest of Technical Papers*(1987), Institute of Electrical Engineers of Japan, pp. 112–115.

Petersen, K.E., et al., "Micromechanical Accelerometer Integrated with MOS Detection Circuitry", IEEE, vol. ED–29 No. 1 (Jan. 1982), pp. 23–27.

Petersen, Kurt E., et al., "Silicon as a Mechanical Material", *Proceedings of the IEEE*, vol. 70, No. 5, May 1982 pp. 420–457.

"Quartz Rate Sensor Replaces Gyros", *Defense Electronics*, Nov. 1984, p. 177.

Rosen, Jerome, "Machining In the Micro Domain", *Mechanical Engineering*, Mar. 1989, pp. 40–46.

Teknekron Sensor Development Corporation, article entitled "Micro–Vibratory Rate Sensor", 1080 Marsh Road, Menlo Park, CA 94025, 2 pages, undated.

Bryzek, Janusz et al., "Micromachines on the March", IEEE Spectrum, May 1994, pp. 20–31.

IEEE Robotics & Automation Soc, in coop. w/ASME Dynamic Systems & Control Div., "Micro Electro Mechanical Systems, An Investigation of Mirco Structures, Sensors, Actuators, Machines and Systems", IEEE Cat. #93CH3265–6, Library of Congress #92–56273, Ft. Lauderdale, Fl. Feb. 7–10, 1993.

Biasing motor sense combs with fixed voltage and blocking capacitor.

Biasing motor sense combs with voltage applied to preamplifier positive input.

SPLIT ELECTRODE TO MINIMIZE CHARGE TRANSIENTS, MOTOR AMPLITUDE MISMATCH ERRORS, AND SENSITIVITY TO VERTICAL TRANSLATION IN TUNING FORK GYROS AND OTHER DEVICES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Micromechanical tuning fork gyroscopes such as that shown in FIG. 1 are known. The tuning fork gyroscope includes silicon proof masses which are suspended by support flexures above a glass substrate, and comb electrodes which are used for oscillating the proof masses. Metallic sense electrodes are disposed on the glass substrate below the proof masses for detecting Coriolis motion by indicating out-of-plane capacitance changes. Because the tuning fork gyroscope operates in this manner, it is desirable that the amplitude of the oscillation be held at a predetermined constant in order to provide a more accurate output indicating rate.

The amplitude of the oscillating motor of tuning fork gyroscopes is typically controlled by a conventional servo loop connected to a single capacitive in-plane pick-off ("center electrode"). In this technique motor position is converted to a proportional voltage by measuring charge variation on the center electrode which is biased with a DC voltage. The resulting motor position signal is amplified and detected by a full wave rectifier. The rectifier output is then filtered, and the filtered voltage compared against a reference voltage; the difference forming an error voltage. This error voltage is then used to control the motor drive amplitude using a loop controller to adjust motor amplitude to a predetermined constant. However, this particular technique has a potential drawback.

The conventional servo loop technique may have some instability in the center electrode. The sensitivity of the DC biased center electrode varies slowly over time due to a spurious charge accumulation on the glass substrate beneath the center electrode. As this charge accumulates on the glass, the sensitivity of the center electrode is modified. In response, the loop controller calls for modified drive force to compensate. The result is a motor amplitude transient wherein amplitude changes over time as substrate charge accumulates. This will result in lower accuracy than is otherwise possible because of the relationship between amplitude and Coriolis force in the system.

BRIEF SUMMARY OF THE INVENTION

In accordance with the present invention, a tuning fork gyroscope includes a plurality of center and outer electrodes. The total proof mass structure comprises two independent masses, a right and a left, connected by a series of beams and flexures. Charge into the proof mass structure is the mechanism by which Coriolis Force is measured. Center and outer motor plurality allows generation and detection of proof mass motion while minimizing charge injection into the total proof mass structure resulting from inequalities in the amplitude and/or phase of the relative proof masses. By forming an electrode configuration that provides each of the masses with split center and outer motor electrodes, errors from mismatch in relative amplitude or phase can be rejected. By applying excitations of equal and opposite potentials to each set of independent center and outer motor electrodes, each mass cancels the charge generated by its own motion, thereby reducing the in-phase bias errors and minimizing limitations on dynamic range. Because each proof mass interacts with independent split center and outer electrodes having equal and opposite potentials, the net charge generated in the total proof mass structure from amplitude mismatch errors is minimized.

Splitting both the center and outer motor electrodes desensitizes the gyro to errors from charge injection into the proof mass from mismatch in the amplitude between the right and left proof masses. Charge injection results from each proof mass' interaction with the excitations used to provide both the electrostatic forcing and detection of proof mass motion. A net charge injection occurs if the charge generated from the right proof mass and left proof mass are not equal and opposite, a prevailing condition if the oscillatory displacements of the right and left proof masses are mismatched in amplitude and/or phase. By splitting the center and outer motor electrodes evenly and applying excitations of opposing magnitude, each proof mass cancels the charge inherent in its own motion, thereby reducing in-phase bias errors and dynamic range limitations.

The center electrodes reduce substrate charging effects and reduce undesirable motor lift forces by providing equal numbers of oppositely biased center electrodes. The center electrodes are arranged to provide electrical symmetry across the tuning fork gyroscope. Because of the symmetry, voltages induced in the substrate by the center electrodes are equal and opposite so that the effect of substrate charging on in-phase bias is reduced. Further, currents injected directly into the proof masses are equal and opposite, and therefore tend to cancel. As a result, motor lift forces are equal and the proof masses move in pure translation, thereby reducing in-phase bias. The net current injected into the proof mass is the gyroscope output signal. This current flows through the anchors into a transimpedance amplifier which converts charge (the integral of current) into an output voltage. The transimpedance amplifier holds the proof mass at virtual ground. Maintaining electrical symmetry greatly reduces erroneous signals from in-plane motion, from common mode proof mass translation normal to the substrate, and from charge transients. With opposite biases on the sense electrodes, the desired gyroscope output is the differential vertical displacement.

BRIEF DESCRIPTION OF THE SEVERAL VIEWS OF THE DRAWING

The invention would be more fully understood in light of the following detailed description of the drawing in which.

DETAILED DESCRIPTION OF THE INVENTION

Figure 1:
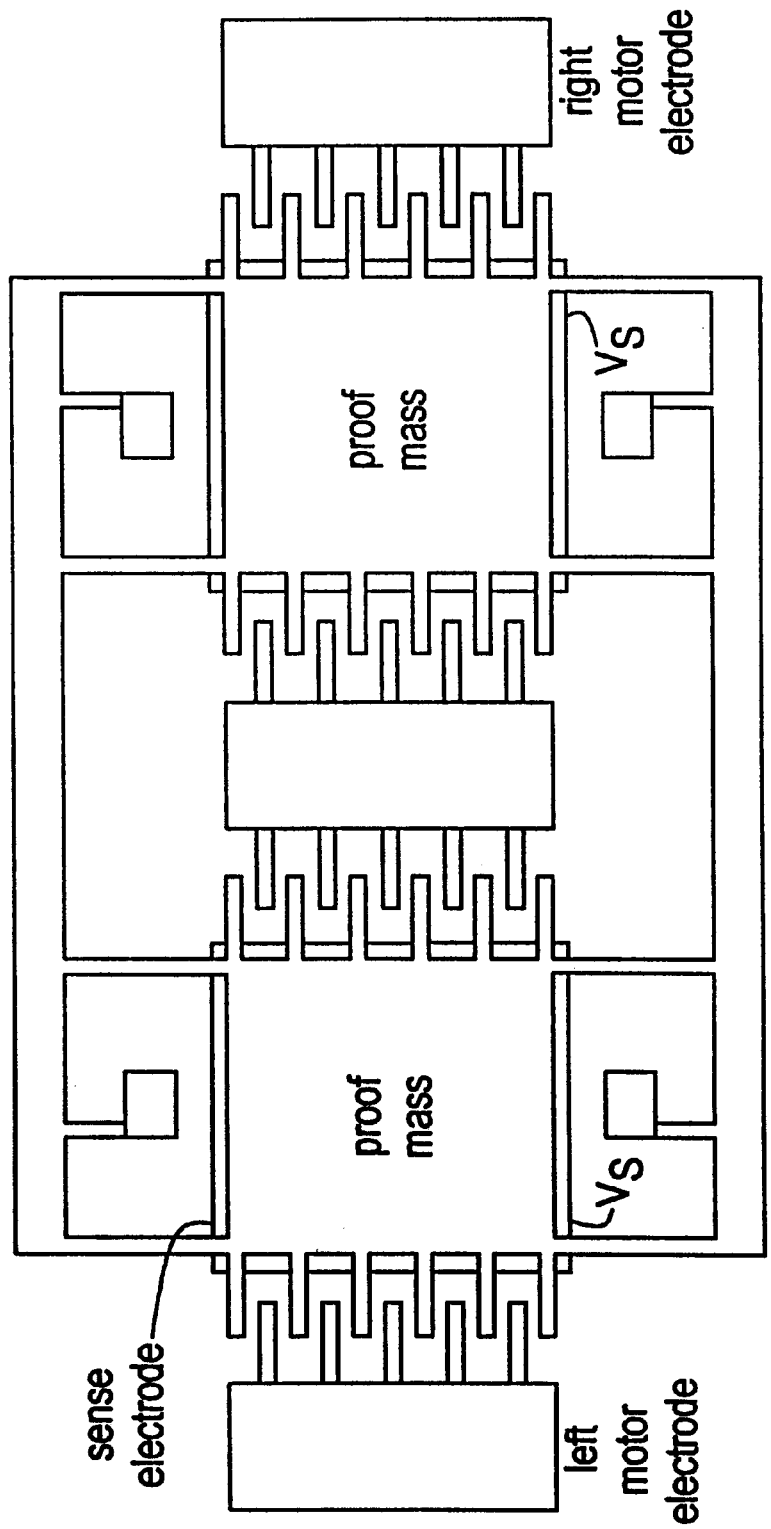
FIG. 1 is a diagram of a prior art tuning fork gyroscope.
Figure 2:
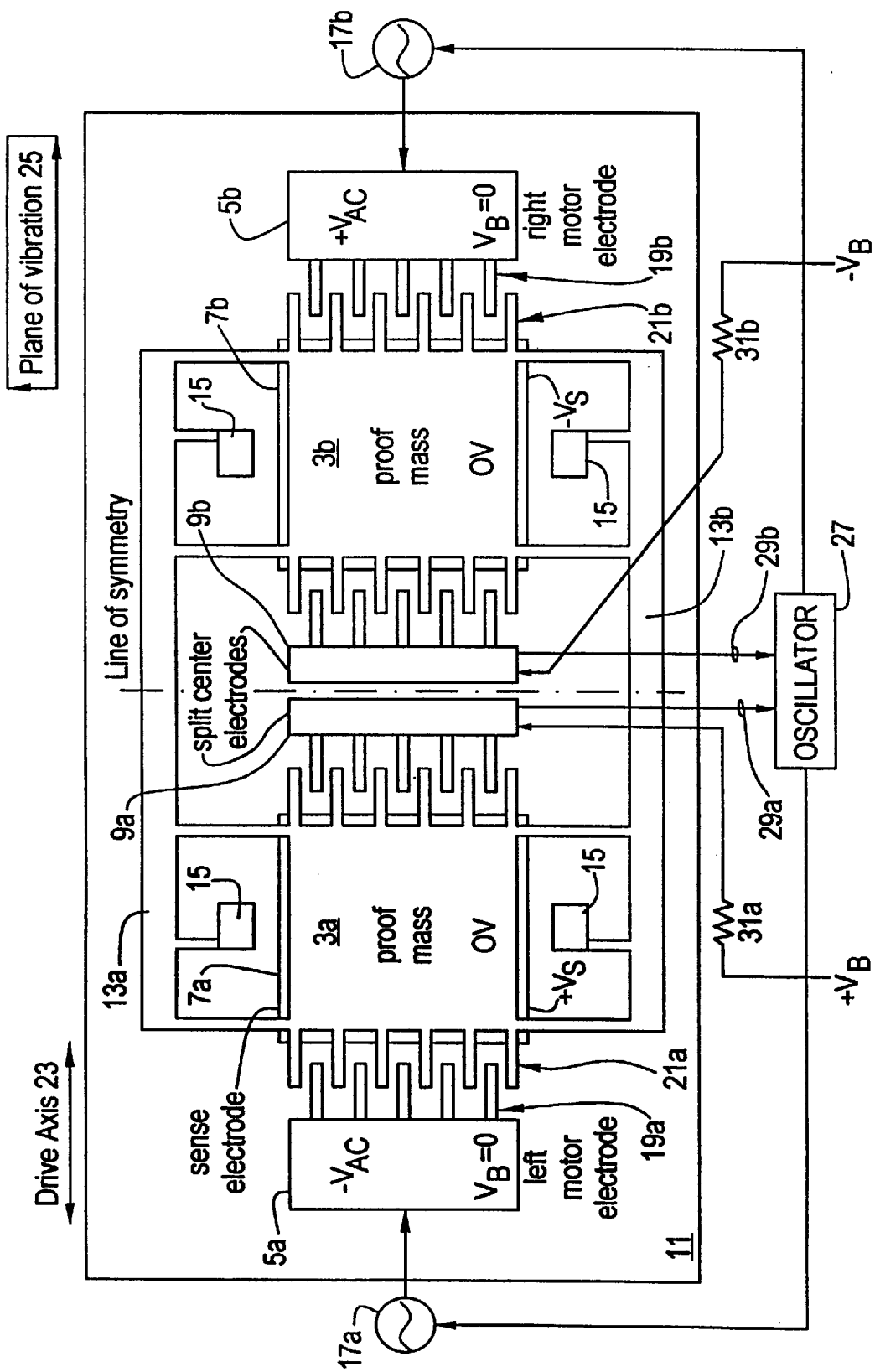
FIG. 2 is a diagram of a tuning fork gyroscope with a plurality of center electrodes.

A micromechanical tuning fork gyroscope is illustrated in FIG. 2. The tuning fork gyroscope includes first and second proof masses 3a, 3b, first and second motor electrodes 5a, 5b, first and second sense electrodes 7a, 7b, first and second center electrodes 9a, 9b, and a substrate 11. The center electrodes, sense electrodes and motor electrodes are disposed on the substrate. The proof masses are disposed over the sense electrodes, being supported by flexures 13a, 13b. The flexures are attached to the substrate at anchor points 15 and permit movement of the proof masses relative to the sense electrodes. Each proof mass includes combs extending outward from first and second sides thereof. The center electrodes and motor electrodes also include combs. The combs of motor electrode 5a are interleaved with the combs of proof mass 3a, the combs of center electrode 9a are interleaved with the combs of proof mass 3a, the combs of center electrode 9b are interleaved with the combs of proof mass 3b and the combs of motor electrode 5b are interleaved with the combs of proof mass 3b.

The operation of the tuning fork gyroscope is electromechanical. Time varying drive signals 17a, 17b are provided to motor electrodes 5a, 5b, respectively. The drive signals generate electrostatic coupling between interleaved combs 19a, 19b, 21a, 21b, attached to the motor electrodes 5a, 5b and proof masses 3a, 3b, respectively, and impart an oscillating force upon the proof masses along a motor drive axis 23. The oscillating force causes the proof masses to oscillate in a plane of vibration 25. In response to an inertial input such as a rotational rate, the proof masses deflect out of the plane of vibration. Sense biases $+V_s$, $-V_s$ are applied to the sense electrodes 7a, 7b, respectively to establish a potential between the sense electrodes 7a, 7b and the proof masses 3a, 3b, respectively, so that changes in capacitance between the electrodes and the adjacent proof masses as a result of the deflection out of the plane of vibration can be measured.

Measurement of an inertial input with the tuning fork gyroscope is based upon the principal of Coriolis force.

$$F_c = 2m \vec{\Omega} \times \vec{V} \quad (1)$$

Where m is mass $\vec{V}$ is the proof mass velocity and $\vec{\Omega}$ is the input rate.

Mass and velocity are known for the tuning fork gyroscope. Hence, inertial input motion can be measured based upon charge variation between the proof masses and sense electrodes. However, in order to achieve accurate results it is important that the proof mass velocity remain constant.

Figure 4:
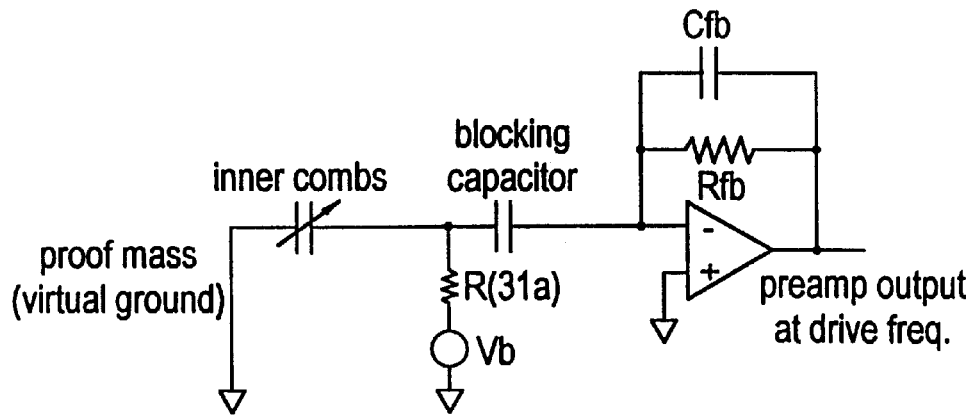
FIGS. 4 and 5 illustrate circuits for applying motor bias.
Figure 5:
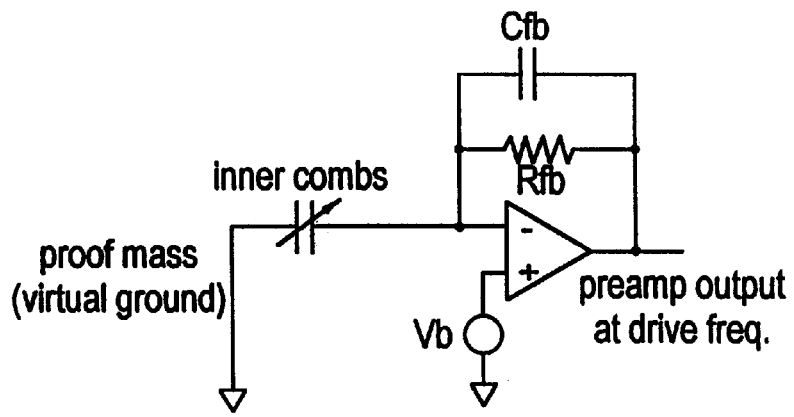

An oscillator circuit 27 is employed to measure proof mass velocity from at least one of the center electrodes 9a, 9b and, in response thereto, vary the drive signals 17a, 17b to compensate for variations in velocity. Bias potentials $+V_B$, $-V_B$ are applied to the center electrodes 9a, 9b, respectively, in order to facilitate measurement of proof mass velocity through feedback signals 29a, 29b. The bias signals $+V_B$, $-V_B$ are coupled to the center electrodes 9a, 9b through resistors, 31a, 31b. Charge variations caused by displacement of the proof masses in the plane of vibration are then detected and employed as feedback. The bias signals $+V_B$, $-V_B$ may be DC voltage, AC voltage or a combination AC+DC voltage. Further, the bias signals are equal in magnitude and opposite in polarity. Circuits for applying the motor bias are shown in FIGS. 4 and 5. In FIG. 4, the bias may only be DC, but in FIG. 5 AC or DC or AC+DC is suitable.

The changing proximity between the proof mass and the adjacent center electrode, which results in charge variations, is indicated through the electrostatic coupling of the interleaved combs. As the proof mass oscillates, proximity changes over time. Consequently, the potential between the interleaved comb electrodes changes over time. The rate of change of the potential of the feedback signals from the center electrodes are thus indicative of proof mass velocity. In order to maintain constant proof mass velocity, the feedback signals are compared. with reference signals and the result of the comparison is employed to adjust the drive signals.

The oppositely biased center electrodes reduce the effect of undesirable substrate charging by providing electrical symmetry between left and right sides of the tuning fork gyroscope. Symmetry exists where for each bias applied to the tuning fork gyroscope another bias of equal magnitude and opposite polarity exists and where the gyroscope can be bisected into two regions of equal and opposite electrical characteristics. Symmetry reduces the effects of charge transients and sensitivity to vertical translation because the oppositely biased signals applied to the center electrodes tend to cancel. For example, voltages induced in the gyroscope substrate by the bias potentials are equal and opposite, so that substrate charging effect on in-phase bias are reduced. Further, motor lift forces acting on the proof. masses and interleaved comb electrodes are equal and hence the proof masses move in pure translation, thus reducing in-phase bias. Another benefit of symmetry is that pure translation normal to the plane of the gyroscope does not produce a sense axis output. Thus, the sense electrode output only reflects actual inertial motion. The net current injected into the proof mass is the gyroscope output signal. This current flows through the anchors into a transimpedence amplifier which converts charge (the integral of current) into an output voltage. The transimpedence amplifier holds the proof mass at virtual ground. Maintaining electrical symmetry greatly reduces erroneous signals from in-plane motion, from common mode proof mass translation normal to the substrate, and from charge transients. With opposite biases on the sense electrodes, the desired gyroscope output is the differential vertical displacement. For these reasons the center electrodes are disposed symmetrically upon the substrate.

Figure 3:
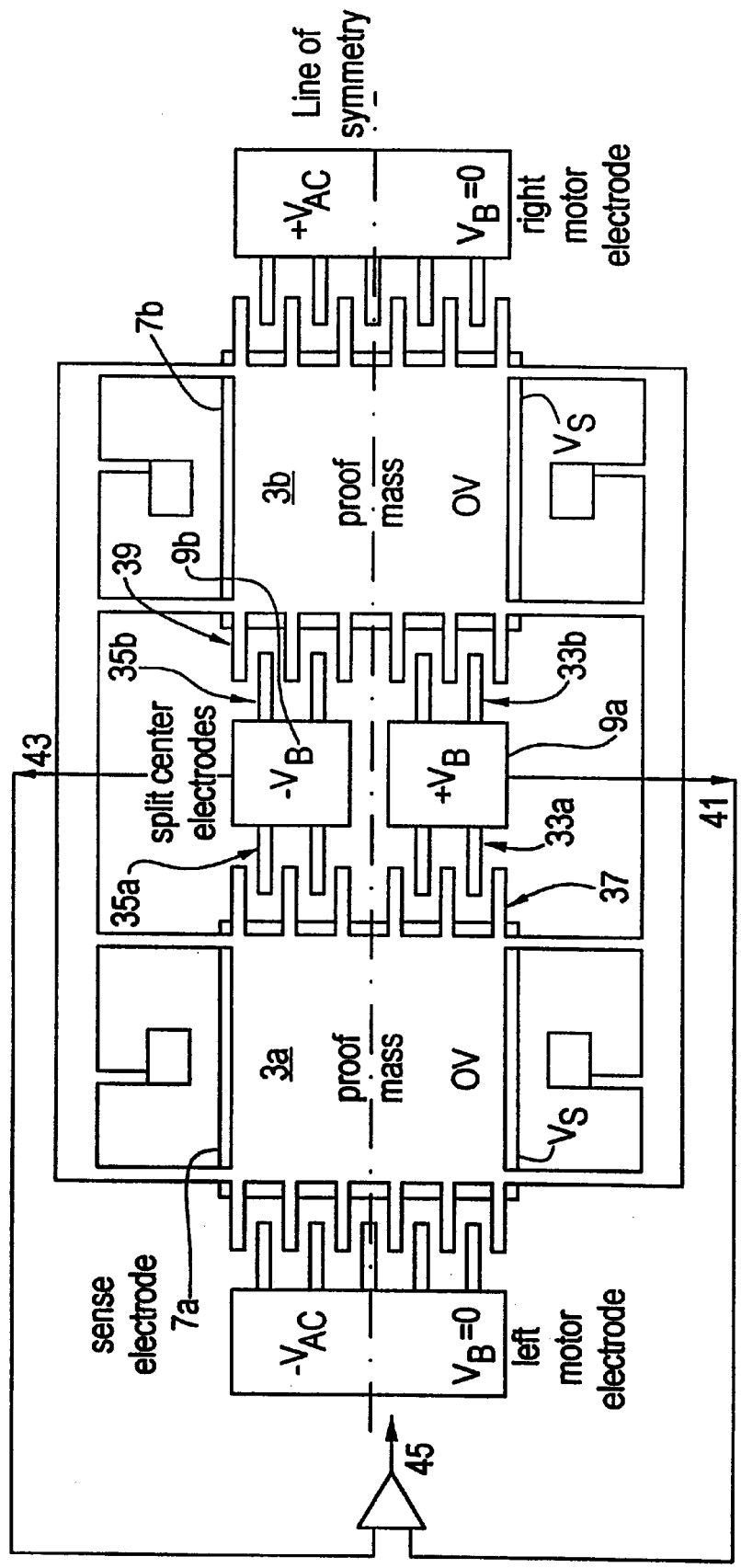
FIG. 3 is an alternative configuration of the tuning fork gyroscope of FIG. 2.

FIG. 3 illustrates an alternative center electrode configuration. In the alternative embodiment, the center electrodes 9a, 9b each include first and second respective sets of comb electrodes 33a, 33b, 35a, 35b, which are interleaved with the comb electrodes 37, 39 of the proof masses 3a, 3b, respectively. That is, each center electrode interacts with both proof masses. As with the previously described embodiment, the center electrodes have bias potentials $+V_B$, $-V_B$ applied thereto, respectively, in order to facilitate measurement of proof mass velocity through feedback signals 41, 43. The bias potentials may be DC voltage, AC voltage or a combination DC+AC voltage. Because each center electrode provides a measurement of the velocity of both proof masses, a single feedback signal from one of the center electrodes may by utilized by the oscillator circuit to maintain a constant proof mass velocity. Alternatively, a differential readout 45 may be employed with the feedback signals from each center electrode to provide an indication of proof mass velocity. Since each of the center electrodes interact with both the proof masses, currents injected into the proof masses through the center electrodes are equal and opposite, and thus effectively cancel.

Figure 6:
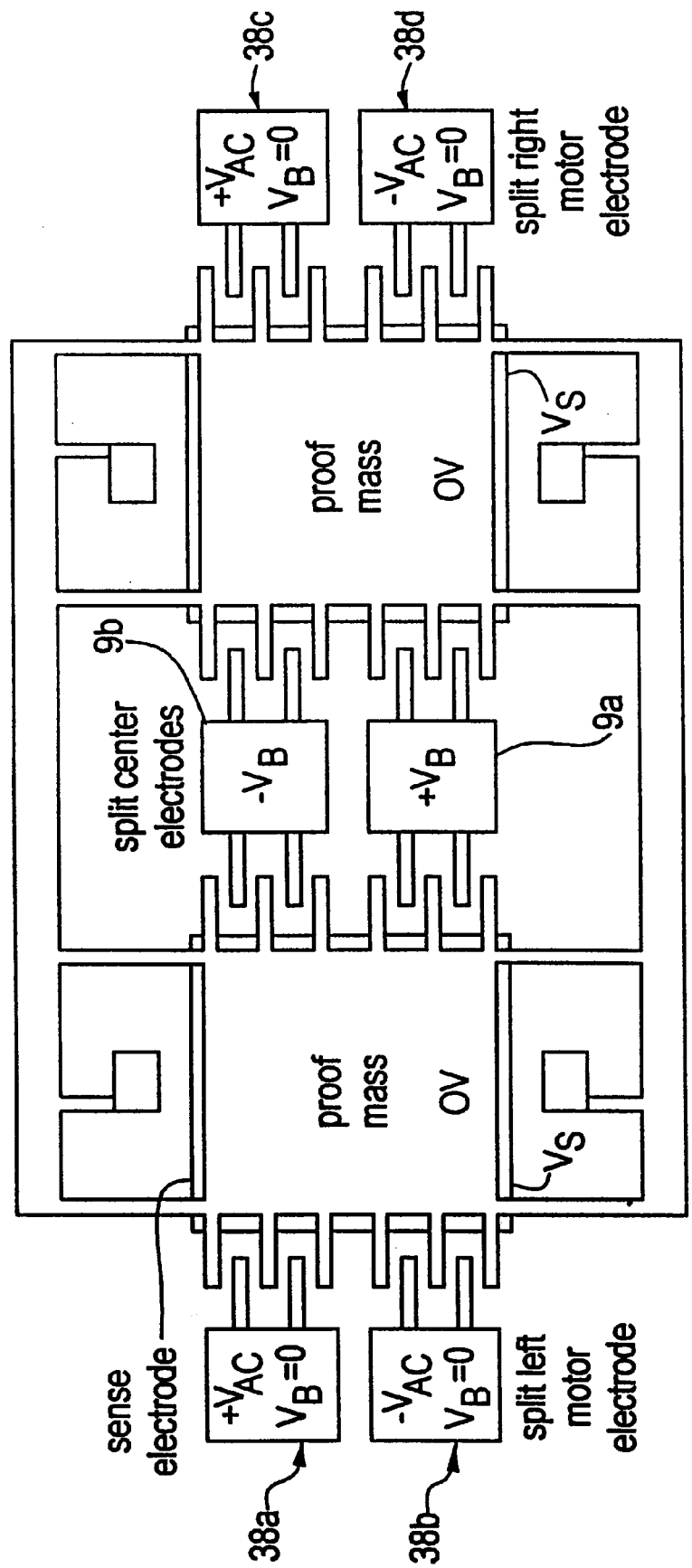
FIG. 6 is a diagram of the tuning fork gyroscope with a plurality of outer motor electrodes.

Another alternative embodiment is illustrated in FIG. 6. In this embodiment the center electrodes 9a, 9b are split as described with respect to FIG. 3, above. Additionally, the gyro includes split left 38a, 38b and right 38c, 38d motor electrodes. To achieve symmetry +VAC is applied to electrodes 38a, 38c, and −VAC is applied to electrodes 38b, 38d.

It will now be apparent in view of the above description that the present invention defines a method for sensing oscillatory motion of an oscillating mass. Sensing oscillatory motion includes providing an even number of oscillatory motion sensing elements, biasing first and second groups of the oscillatory motion sensing elements with first and second bias potentials of opposite polarity, the first and second groups of oscillatory motion sensing elements being equal in number, and then sensing oscillatory motion with at least one of the oscillatory motion sensing elements. By arranging the oscillatory motion sensing element in equal groups which are biased with signals of opposite polarity, stray current and voltage injection into other elements of the device tend to cancel. Such injection is typically through interleaved comb electrodes, and arrangement of oscillatory motion sensing elements can be such that each element is coupled to only one oscillating mass, or such that each element is coupled to more than one oscillating mass. Depending on the arrangement, the symmetry of the device will change as described above. Hence, the technique of balancing the injected current through an even number of electrodes also applies to rotary vibrating gyroscopes.

It should be understood that various changes or modifications may be made from the embodiment being disclosed. Accordingly, the invention is not to be viewed as limited except by the scope and spirit of the appended claims.

What is claimed is:

1. A micromechanical tuning fork gyroscope for measuring an inertial input, comprising:

a substrate;

first and second sense electrodes disposed symmetrically on said substrate;

at least first and second proof masses disposed over said first and second sense electrodes, respectively, said first and second proof masses having comb electrodes extended from respective inner and outer sides thereof;

first and second motor electrodes disposed symmetrically on said substrate, said first and second motor electrodes having comb electrodes, said comb electrodes of said first and second motor electrodes interleaved with the outer side comb electrodes of said first and second proof masses, respectively; and first and second oppositely biased center electrodes disposed symmetrically on said substrate, said first and second center electrodes having comb electrodes at least one of said center electrodes comb electrodes being interleaved with innerside comb electrodes of said first proof mass and providing a feedback signal indicative of velocity of said first proof mass.

2. The tuning fork gyroscope of claim 1 wherein said comb electrodes of said second center electrode are interleaved with said innerside comb electrodes of said second proof mass.

3. The tuning fork gyroscope of claim 2 wherein said first portion center electrode includes comb electrodes interleaved with a portion of said comb electrodes of said second proof mass and said second center electrode includes comb electrodes interleaved with a portion of said comb electrodes of said first proof mass.

* * * * *

UNITED STATES PATENT AND TRADEMARK OFFICE
CERTIFICATE OF CORRECTION

PATENT NO : 5,911,156
DATED : June 8, 1999
INVENTOR(S) : Paul A. Ward, et al.

It is certified that error appears in the above-identified patent and that said Letters Patent are hereby corrected as shown below:

Column 6, line 16, "having comb electrodes at least one of said center" should read --having comb electrodes, at least one of said center--; and Column 6, line 26, delete "portion".

Signed and Sealed this

Fifteenth Day of May, 2001

*Attest:*

NICHOLAS P. GODICI

*Attesting Officer*  *Acting Director of the United States Patent and Trademark Office*